(12) United States Patent
Ueda et al.

(10) Patent No.: US 7,116,329 B2
(45) Date of Patent: Oct. 3, 2006

(54) IMAGE PROCESSING METHOD

(75) Inventors: Ryuta Ueda, Tokyo (JP); Kazuhisa Hasuoka, Tokyo (JP)

(73) Assignee: Sega Corporation, Tokyo (JP)

( * ) Notice: Subject to any disclaimer, the term of this patent is extended or adjusted under 35 U.S.C. 154(b) by 237 days.

(21) Appl. No.: 10/704,830

(22) Filed: Nov. 12, 2003

(65) Prior Publication Data

US 2004/0095353 A1   May 20, 2004

Related U.S. Application Data

(63) Continuation of application No. PCT/JP02/04753, filed on May 16, 2002.

(30) Foreign Application Priority Data

May 16, 2001   (JP)   ............................. 2001-146309

(51) Int. Cl.
    *G06T 15/00* (2006.01)
(52) U.S. Cl. ........................... 345/473; 700/64; 703/22
(58) Field of Classification Search ........ 345/473–475; 703/22; 700/64–66
    See application file for complete search history.

(56) References Cited

U.S. PATENT DOCUMENTS

| | | | |
|---|---|---|---|
| 5,838,890 A * | 11/1998 | Aoki et al. | 345/474 |
| 6,320,582 B1 * | 11/2001 | Yamamoto et al. | 345/427 |
| 6,456,289 B1 * | 9/2002 | O'Brien | 345/473 |
| 6,514,142 B1 * | 2/2003 | Hattori et al. | 463/31 |
| 6,664,965 B1 * | 12/2003 | Yamamoto et al. | 345/473 |
| 6,778,948 B1 * | 8/2004 | Kanetaka et al. | 703/22 |
| 2002/0027555 A1 | 7/2002 | Mori | 345/475 |

FOREIGN PATENT DOCUMENTS

| | | |
|---|---|---|
| EP | 1085472 A | 3/2001 |
| JP | 7-93586 | 4/1995 |
| JP | 7-328228 | 12/1995 |
| JP | 11-39502 | 2/1999 |
| JP | 11-306391 | 11/1999 |
| JP | 11-306394 | 11/1999 |
| JP | 2000-107456 | 4/2000 |

OTHER PUBLICATIONS

Loke et al., Rendering Fireworks Displays, IEEE, May 1992, pp. 33-43.*
Donnelly, The Fireworks Effect: Exploring Trajectory Sets in Time, Computing in Science & Engineering, Jan. 2002, pp. 92-97.*

* cited by examiner

*Primary Examiner*—Phu K. Nguyen
(74) *Attorney, Agent, or Firm*—Dickstein Shapiro Morin & Oshinsky LLP

(57) ABSTRACT

An image processing method is disclosed for more effectively displaying movements of an object composed of a plurality of polygons. The image processing method displays a moving object by displacing backward given vertices of polygons composing the moving object, imparting an afterimage representation that makes the object look as if it leaves a trail in the direction opposite to their direction of movement. This allows for display of movements of the object in a more emphasized manner and display of the moving object with richer expression.

55 Claims, 15 Drawing Sheets

IMAGE PROCESSING METHOD

This application is a continuation of PCT/JP02/04753, filed May 16, 2002.

TECHNICAL FIELD

The present invention relates generally to an image processing method using three-dimensional computer graphics (CG), and more particularly to an image processing method for more efficiently displaying movements of objects made up of polygons.

BACKGROUND ART

In computer games using three-dimensional computer graphics (CG), images are displayed on a computer game apparatus screen that are created by projecting objects, including characters such as humans and animals arranged in a virtual three-dimensional space, onto a given two dimensional plane. Objects are, for example, made up of a plurality of polygons.

These objects can move within the virtual three-dimensional space, for example, through players' operations, with the movements of the objects accordingly shown on the computer screen.

SUMMARY OF THE INVENTION

It is an object of the present invention to provide an image processing method that can more efficiently display movements of objects.

In an image processing methods of the present invention designed to achieve the above object, moving objects are displayed by displacing backward given vertices of polygons making up the moving objects, imparting an afterimage representation to the objects that representation makes the objects look as if they leave a trail in the direction opposite to their direction of movement. This allows for display of movements of the objects in a more emphasized manner and display of the moving objects with richer expression.

A first image processing method of the present invention to achieve the above object is an image processing method for displaying an object, composed of a plurality of polygons, moving in a virtual three-dimensional space, the method comprising the steps of acquiring, at every given sampling timing, coordinates of at least one vertex, whose normal vector has a component opposite to a movement direction vector of the object, among vertices of the polygons composing the object; and displaying the polygon having the at least one vertex assuming that coordinates of the at least one vertex are located at a position displaced by a given length in a direction having the component opposite to the movement direction.

A second image processing method of the present invention is an image processing method according to the first method, further comprising the step of determining, based on an inner product of the normal vector of each vertex and the movement direction vector of the object, whether the normal vector of each vertex has the component opposite to the movement direction vector.

A third image processing method of the present invention is an image processing method wherein the given length is determined based on at least one of the object's distance of movement, velocity of movement, acceleration of movement and direction of movement.

A fourth image processing method of the present invention is an image processing method according to the first or the second method, wherein the given length is determined based on coordinates at a current sampling timing and on coordinates at a last sampling timing.

A fifth image processing method of the present invention is an image processing method according to the first or the second method, wherein the given length is determined based on a magnitude of the movement direction vector.

A sixth image processing method of the present invention is an image processing method according to the fourth or the fifth method, wherein the given length is determined further in consideration of the inner product of the normal vector of each vertex and the movement direction vector of the object.

A seventh image processing method of the present invention is an image processing method according to any one of the fourth to sixth methods, wherein the given length is determined further in consideration of a displacement ratio imparted to each vertex.

An eighth image processing method of the present invention is an image processing method according to the seventh method, wherein the displacement ratio is set to different values for each vertices.

A ninth image processing method of the present invention is an image processing method according to the seventh or the eighth method, further comprising the step of setting a transparency level set for the vertices to a value obtained by subtracting the displacement ratio of each vertex from a preset value.

A tenth image processing method of the present invention is an image processing method according to the first method, further comprising the step of setting a transparency level set for the vertices to a value lower than a preset value.

An eleventh image processing method of the present invention is an image processing method according to the tenth method, wherein the transparency level set for the vertices is set to the value obtained by subtracting from a preset transparency level an absolute value of the inner product of the normal vector of each vertex and the movement direction vector of the object.

A twelfth image processing method of the present invention is an image processing method according to the first method, wherein the displayed polygons are displayed such that at least one of transparency level, saturation, lightness and hue changes with change in distance to the vertex.

A thirteenth image processing method of the present invention is an image processing method according to the twelfth method, wherein a magnitude of the change is determined based on at least one of the object's distance of movement, velocity of movement, acceleration of movement and direction of movement.

A program is also provided for causing a computer apparatus to execute the steps of any one of the first to thirteenth image processing methods.

An image processing apparatus is also provided for executing any one of the first to thirteenth image processing methods.

Further features of the present invention will become apparent from embodiments of the present invention which will be described with reference to the drawings which follow.

DETAILED DESCRIPTION

Embodiments of the present invention will be described hereinbelow. Technical scope of the present invention, however, are not limited to such embodiments.

Figure 1:
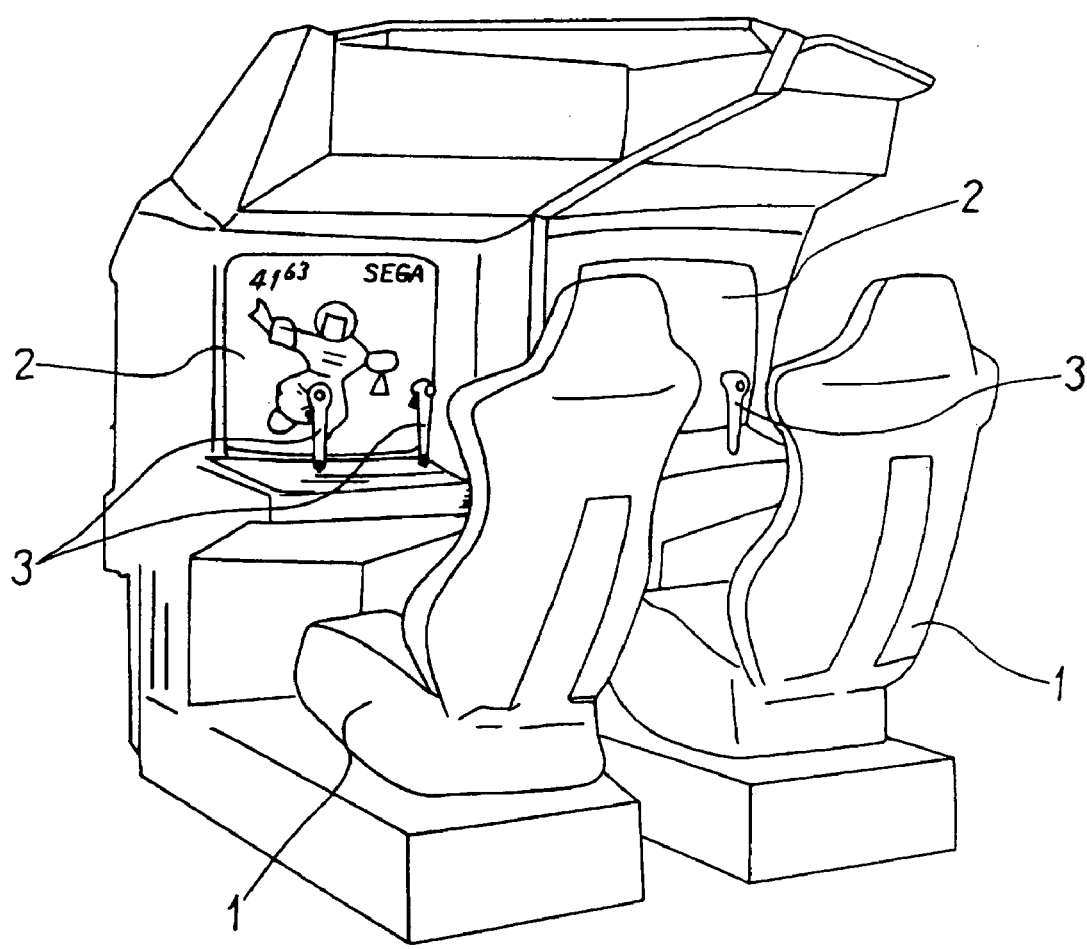
FIG. 1 illustrates an appearance of a computer game apparatus that is an image processing apparatus of an embodiment of the present invention.
Figure 2A:
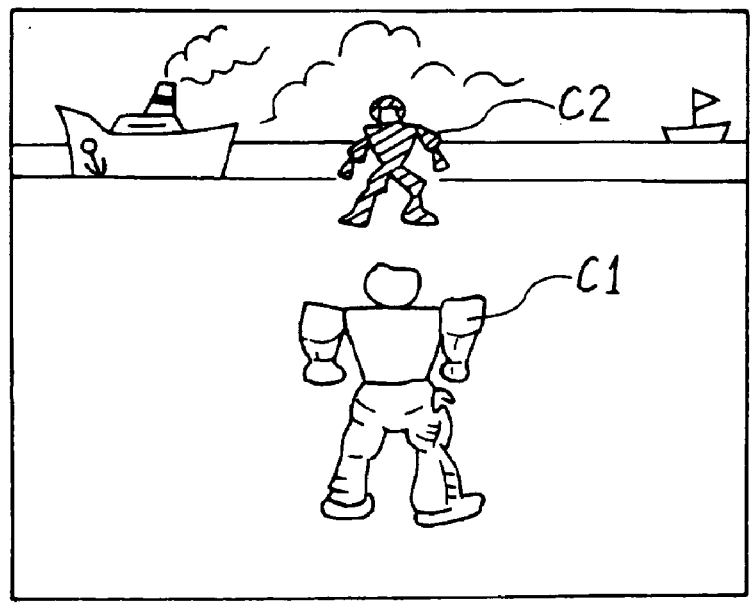
FIG. 2 illustrates examples of images in a three-dimensional virtual space displayed on a display 2.
Figure 2B:
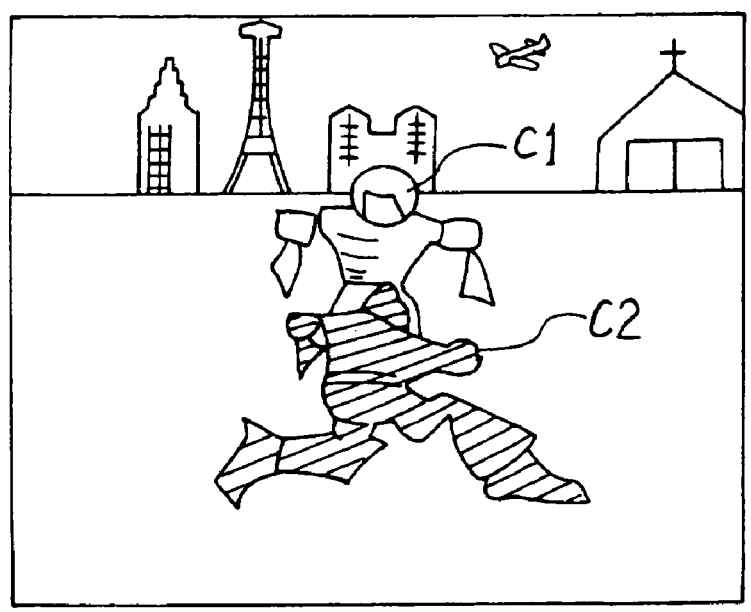

FIG. 1 illustrates an appearance of a computer game apparatus (game unit) that is an image processing apparatus of an embodiment of the present invention. FIG. 1 shows a case in which two identical game units are connected together. According to FIG. 1, a game starts when a player sits on a seat 1 and inserts a given charge into a coin slot not shown. A display 2 shows a virtual three-dimensional space in which characters C1 and C2 are placed as shown in FIGS. 2A and 2B. While watching a game screen appearing on the display 2, the player, for example, moves the character C1 by operating it, for example, to fight against the other character C2 using operating sections 3 that are levers equipped with buttons.

Figure 3:
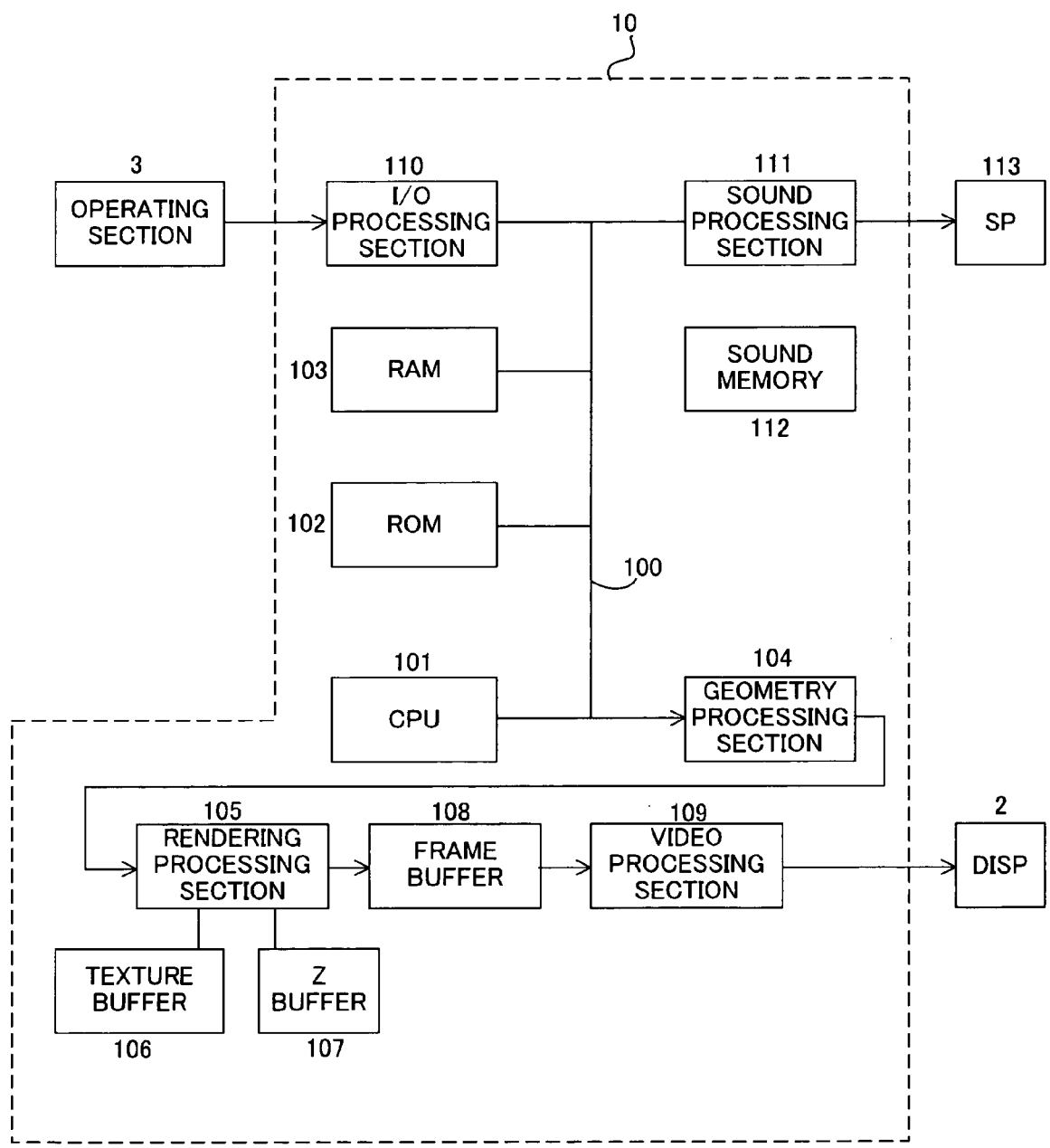
FIG. 3 is a block diagram showing an example of configuration of a game unit incorporated in the computer game apparatus.

FIG. 3 illustrates a block diagram showing an example of configuration of a game unit according to the present invention incorporated in the computer game apparatus. An area 10 enclosed by a dotted line in FIG. 3 represents a portion accommodated in the main body of the game unit. According to FIG. 3, various constituent elements described below such as CPU are connected via a bus 100.

A CPU 101 controls program execution based on a game program stored in a ROM 102. The ROM 102 is used as a generic name for program storage devices and includes, for example, a hard disk drive and an optical disk drive that reads an optical disk storing the program. In a RAM 103 given game parameters updated with the progress of the game such as characters' coordinates in a virtual space are stored.

These parameters stored in the RAM 103 are sent to a geometry processing section 104. The geometry processing section 104 obtains vertex data (including coordinates) for characters and polygons making up the background in the game's three-dimensional virtual space at every given sampling timing (1/60 second) and performs given coordinate conversion processings described later based on the vertex data. Put simply, polygon coordinates in a world coordinate system set in a three-dimensional virtual space are converted to a viewpoint coordinate system which determines how the polygon coordinates are expressed when someone sees the virtual space from a certain point in the world coordinate system.

Further, a rendering processing section 105 is connected to the geometry processing section 104. A texture buffer 106 is connected to the rendering processing section 105. In the texture buffer 106 data such as the polygon vertex data and data of textures mapped onto such polygons, which data are loaded from the ROM (program storage device) 102 are temporarily stored. The rendering processing section 105 performs processings such as adding colors to, shading and pasting textures to polygons based on polygon texture data stored in the texture buffer 106.

Further, the rendering processing section 105 converts polygon coordinates, converted to the viewpoint coordinate system in the three-dimensional virtual space, to a two dimensional coordinate system for display on the display 2. In Z buffer 107, connected to the rendering processing section 105, data information (e.g., which polygon is to be placed to the front) regarding the direction of depth (Z direction) used during conversion of the polygon coordinates from three-dimensional to two dimensional coordinate systems are stored.

A frame buffer 108 is connected to the output side of the rendering processing section 105. In the frame buffer 108 a screenful of data to be displayed on the display 2 are stored. The screenful of image data loaded from the frame buffer 108 is converted to video signal by a video processing section 109 and displayed in succession on the display 2.

The operating sections 3, having levers and switches to be operated by players, are also connected via an I/O processing section 110. The CPU 101 computes characters and other coordinates in the virtual space based on operation signals input from the operating sections 3, after which computation results are sent to the geometry processing section 104.

A sound processing section 111 is further connected to the bus 100, controlling the pronunciation of a PCM/FM sound source. A sound memory 112 is connected to the sound processing section 111 for storing voice data.

Further, voice data controlled by the sound processing section 111 is converted from digital to analog sound sources by a D/A converter circuit not shown, sending audio signal to a speaker 113.

The aforementioned method for finding character coordinates will be described next. First, character positions in the game virtual space are given in position coordinates ($X_W$, $Y_W$, $Z_W$) in the three-dimensional coordinates (world coordinate system) in the virtual space. Positions of the background such as fixed objects other than characters in the virtual space are also given in position coordinates in the world coordinate system. Movements of characters in the virtual space are processed as changes to position coordinates in the world coordinate system. More specifically, character position coordinates W are computed by the CPU 101's computation based on information on the distance and the direction of movement contained in operation signals from the operating sections 3 and others.

On the other hand, images are shown on the display 2 as two dimensional images seen in a given direction from coordinates of a given point (viewpoint coordinates) in the world coordinate system in the three-dimensional virtual space. This makes players feel as if images captured by a video camera, installed at a given position in the virtual space, are shown on the display.

Figure 4:
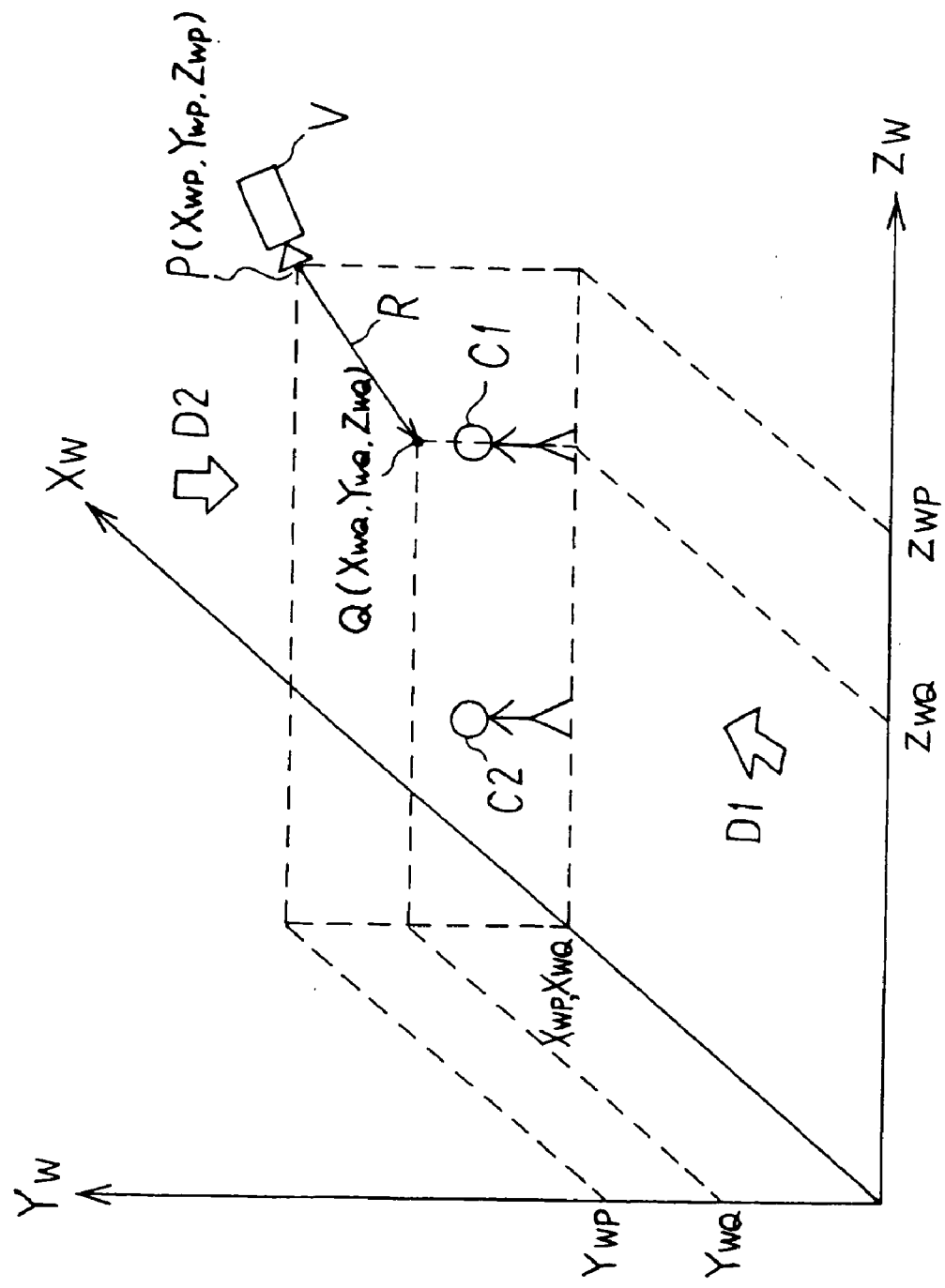
FIG. 4 illustrates an example of three-dimensional virtual space in which characters are placed.

For instance, when the characters C1 and C2 are placed in the three-dimensional virtual space as shown in FIG. 4, character position coordinates are determined by the position coordinates ($X_W$, $Y_W$, $Z_W$) in the world coordinate system. The viewpoint coordinates P ($X_W P$, $Y_W P$, $Z_W P$) are, for example, set at viewpoint coordinates P in the back of and diagonally above the character C1 in the world coordinate system while a direction of line of sight R from the viewpoint coordinates P is, for example, set in the direction of coordinates Q ($X_W Q$, $Y_W Q$, $Z_W Q$) of a gazing point close to and above the character C1 (e.g., a position slightly higher than the head of the character C1) as shown in FIG. 4. Note that the position of the viewpoint coordinates P is marked "V" to represent a virtual video camera.

Coordinates of characters and others in the world coordinate system are converted by the geometry processing section 104 to a viewpoint coordinate system ($X_V$, $Y_V$, $Z_V$) that is based on the viewpoint coordinates P and the direction of line of sight R and further converted by the rendering processing section 105 shown in FIG. 3 to a two dimensional screen coordinate system (Xs, Ys) through given projection conversion processing for display of two dimensional images on the display 2.

Embodiments of the present invention provide image processing methods for more effectively displaying movements of objects including characters on the display when such objects move within the three-dimensional virtual space. More specifically, to display movements of moving objects in a more emphasized manner, afterimage display processing is performed that makes the objects look as if they leave a trail in the direction opposite to their movements.

Figure 5A:
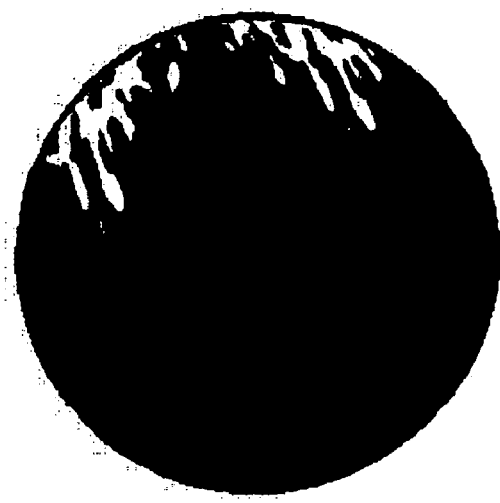
FIG. 5 illustrates examples of objects displayed by the image processing method in the embodiment of the present invention.
Figure 5B:

FIGS. 5A and 5B illustrate examples of objects displayed by an image processing method in an embodiment of the present invention. As a spherical object shown in FIG. 5A moves, an afterimage of the object appears that looks as if the object leaves a trail in the direction opposite to its movement as shown in FIG. 5B, further emphasizing the sphere movement.

Figure 6A:
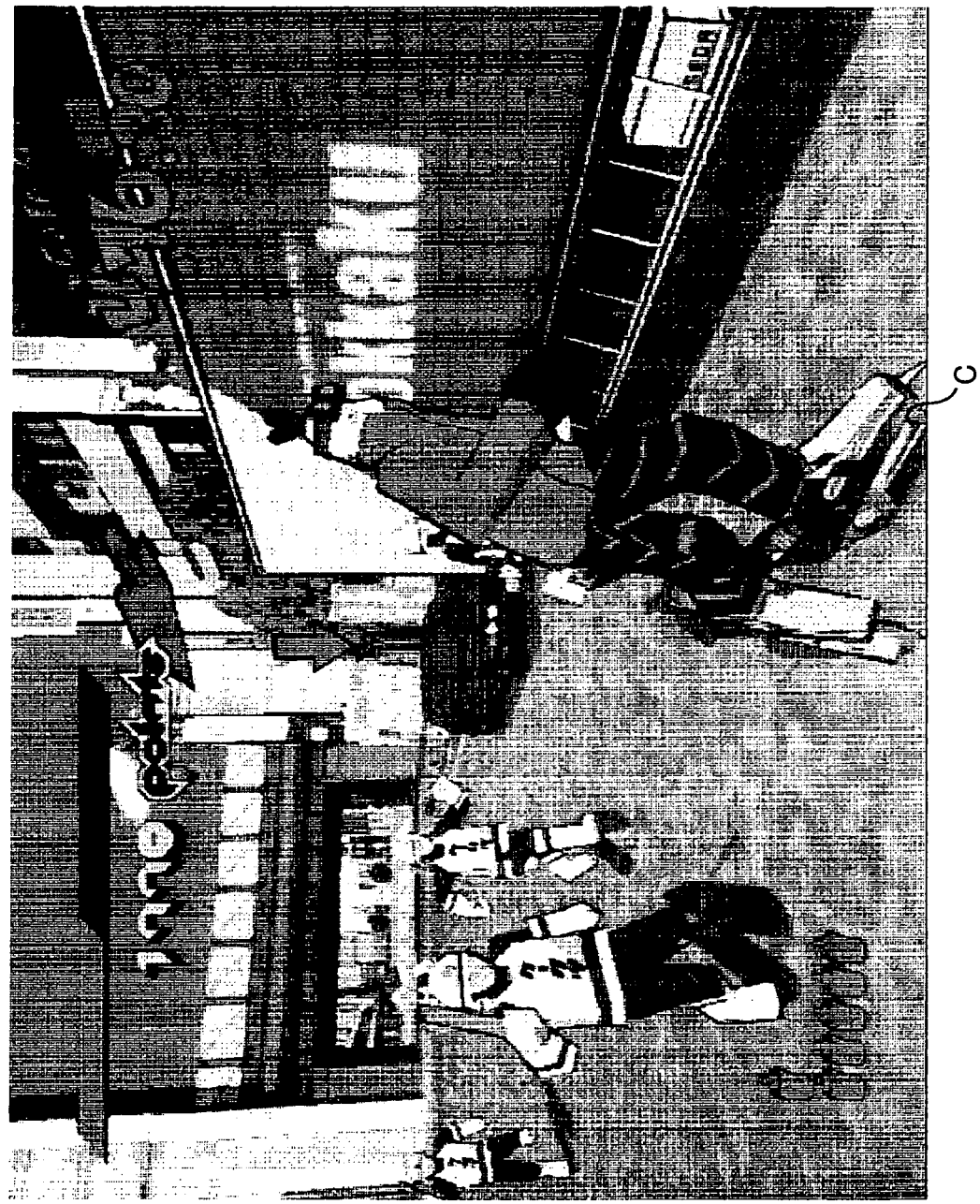
FIG. 6 illustrates first examples of a computer game screen using the image processing method in the embodiment of the present invention.
Figure 6B:
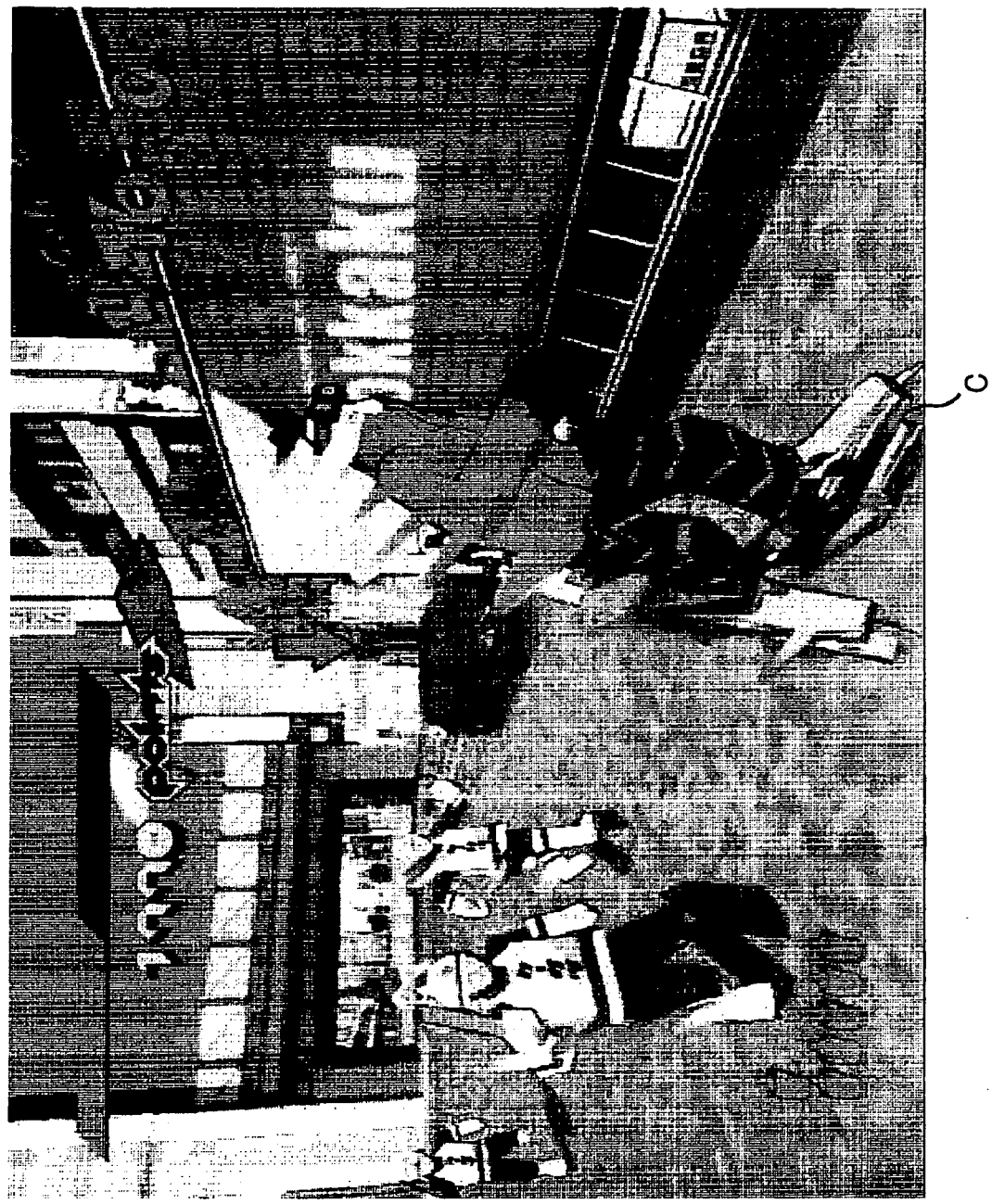
Figure 7A:
FIG. 7 illustrates second examples of computer game screens using the image processing method in the embodiment of the present invention.
Figure 7B:

FIGS. 6A, 6B, 7A and 7B illustrate examples of computer game screens using image processing methods in embodiments of the present invention. FIGS. 6A and 7A illustrate examples of screens with the moving characters C not subjected to afterimage display processing while FIGS. 6B and 7B examples of screens with the characters C subjected to afterimage display processing.

Thus, a given polygon or polygons that make up an object are extended in embodiments of the present invention to display an afterimage together with the object.

Figure 8:
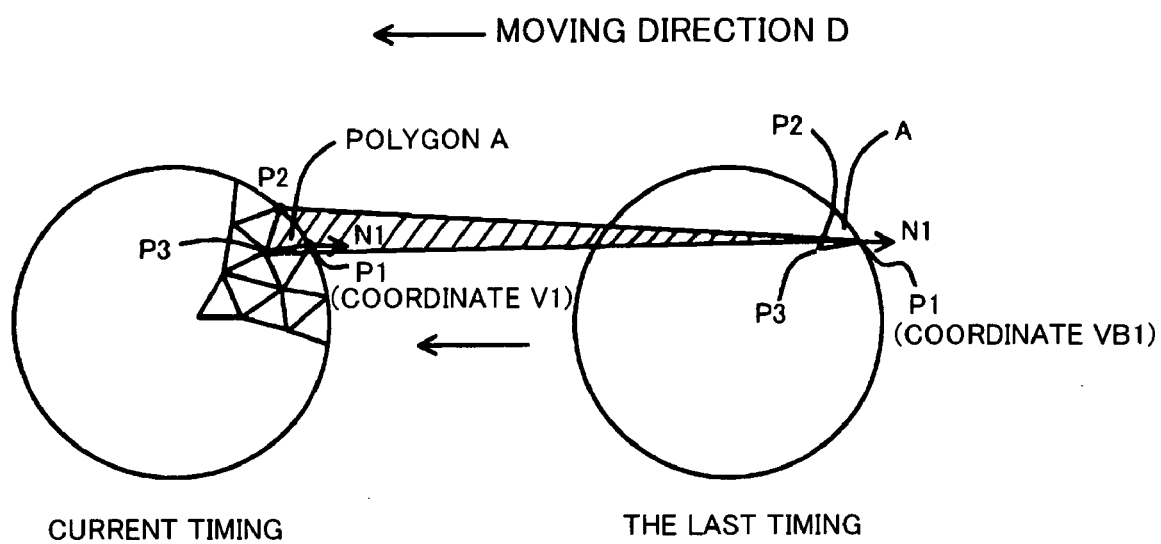
FIG. 8 is a schematic explanatory view of the image processing method in the embodiment of the present invention.

FIG. 8 illustrates a diagrammatic sketch of an image processing method in an embodiment of the present invention. A plurality of polygons making up a sphere are shown in FIG. 8. When a normal vector N1 is opposite to the direction of movement of an object as in the case of a vertex P1 of a polygon A shown in FIG. 8, for example, coordinates of the vertex P1 obtained at every given sampling timing are treated as coordinates VB1 at the last timing rather than coordinates V1 at the current timing during rendering processing. This allows for the polygon A to be processed assuming that coordinates of the vertex P1 are located at the coordinates VB1 at the last timing for the displayed image at the current timing, transforming the polygon A into a shape having other vertices P2 and P3 at the current timing and the vertex P1 at the last timing (shaded portion in the figure)—the shape that is extended backward as illustrated when displayed.

Image processing methods in embodiments of the present invention will now be described below in detail. Note that coordinates in the image processing methods explained below may be a world coordinate system or viewpoint coordinate system.

[Processing to Determine Vertices to be Extended]

To display an afterimage that makes objects look as if they leave a trail as the objects moves, a processing is performed to displace backward polygon vertices in the direction opposite to the direction of movement of the objects. First, vertices are selected from among all polygon vertices by the following processing:

(1) Find an Object Movement Direction Vector (MV)

The movement direction vector MV can be found from changes in vertex coordinates of one or a plurality of given polygons making up the object. It is preferred that the vertex or vertices of a given polygon or polygons of a non-rotating part, for example, of the torso be chosen if the character is a human. The movement direction vector MV may be a unit vector.

(2) Correct a Normal Vector (NVn) of Each of the Vertices of Polygons Making Up the Object Based on the Movement Direction Vector (MV)

If there are rotatable parts such as head, arms and legs of a human character and when, for example, the upright state and the state in which the posture is changing from the upright state are considered, the direction of normal vector changes for the vertex or vertices of a polygon or polygons in the part which posture is changing. When the movement direction vector MV is determined based on the character's upright state, the normal vector NVn of each vertex corresponding to the movement direction vector MV is found by correcting, based on each change in the posture (rotation angle in the case of rotation), the normal vector NVn of each polygon into the normal vector NVn of the vertex in the reference state in which the character is upright. The normal vector NVn may be a unit vector.

(3) Find an Inner Product IPn of the Movement Direction Vector MV and the Normal Vector NVn An angle difference between the movement direction vector MV and each of the normal vectors NVn can be found by finding the inner product IPn. More specifically, if the inner product IPn is 1, the angle difference is 0 (zero) degree. That is, the movement direction vector MV and the normal vector NVn are in the same direction. If the inner product IPn is −1, the angle difference is 180 degrees. That is, the movement direction vector MV and the normal vector NVn are pointing in exactly opposite directions. If the inner product IPn is 0 (zero), the angle difference is 90 degrees. That is, the movement direction vector MV and the normal vector NVn are orthogonal to each other.

Therefore, vertices whose inner product IPn is 0 (zero) or more will not be subjected to backward displacement processing since they have a direction component in the same direction as the direction of movement. These vertices are displayed using their coordinates at the current sampling timing as is.

On the other hand, vertices whose inner product IPn is less than 0 (zero) will be selected as vertices to be subjected to backward displacement processing since they have a direction component opposite to the direction of movement. In broad outline, therefore, the latter half of the vertices in the moving object are subjected to backward displacement processing with respect to the direction of movement, with polygons containing those vertices being extended.

[Extension Processing]

For the vertices selected as discussed above to be subjected to backward displacement processing, coordinates are obtained according to any one of the equations (1) through (4) shown below. Note that the equations shown are examples, and equations for carrying out the image processing methods of the present invention are not limited thereto.

Vertex coordinates at the current and last timings among given sampling timings are assumed to be Vn and VBn, respectively.

Note that a displacement ratio Rn used in the equations shown below may be defined. The given displacement ratio Rn for extending each polygon is given to the vertex of each polygon. The displacement ratio Rn can be set in the range 0 to 1. The same value or different values may be given to vertices. If different values are given, they may be randomly given by a program or those values specified by the programmer during program creation may be given.

If the displacement ratios Rn given to vertices are different, polygons are extended by different lengths even when the object's distance of movement remains the same. If the displacement ratios Rn are the same, polygons are extended by the same length. A polygon may be prevented from being extended by giving the 0 (zero) displacement ratio Rn to the polygon.

(1) Determine Coordinates of Vertices to be Displaced from the Current and Last Coordinates $$\text{Vertex coordinates} = (VBn - Vn) \times Rn + Vn \quad [1]$$

In equation [1], if the displacement ratio Rn=1, for example, then the vertex coordinates=VBn. As shown in FIG. 8, the vertex coordinates are displaced from the coordinates at the current timing to those at the last timing. Similarly, if the displacement ratio Rn=0.5, the vertex coordinates are displaced to the mid-position coordinates between the current and last vertex coordinates. Thus, the length by which each vertex is displaced is determined according to vertex coordinates at the current and last timings.

Figure 9B:
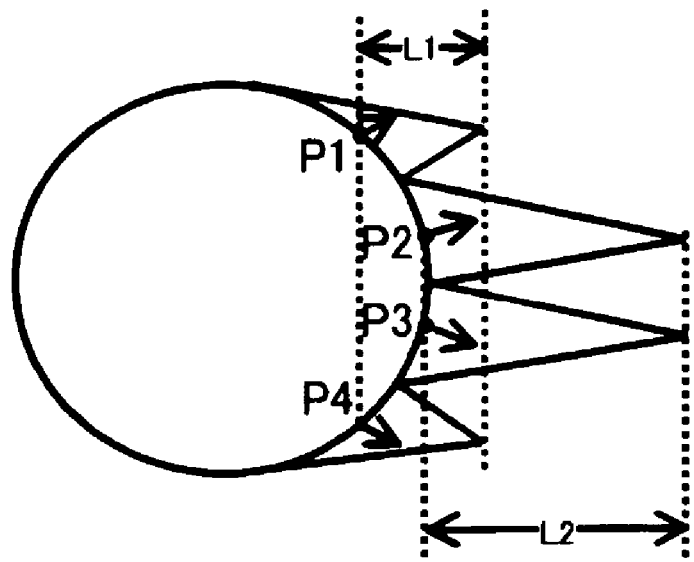
FIG. 9 illustrates examples of objects displayed based on vertex coordinates displaced backward.

FIGS. 9A and 9B illustrate examples of objects displayed based on vertex coordinates displaced backward. FIG. 9A illustrates a diagrammatic sketch of an example of object displayed according to the equation [1], in which if the displacement ratios Rn are the same, vertices are displaced by the same length, that is, polygons are extended by the same length. In FIG. 9A, for example, normal vectors (shown by arrows) of vertices P1, P2, P3 and P4 are displaced by the same length or L although they are pointing in different directions.

(2) Acquire Vertex Coordinates, in Addition to the Vertex Coordinates Determined in (1), such that the Larger the Angle with the Direction of Movement, the Greater the Vertex Displacement Length $$\text{Vertex coordinates} = (VBn - Vn) \times Rn \times (-IPn) + Vn \quad [2]$$

The larger the angle difference between the normal vector NVn and the movement direction vector MV, the larger the absolute value of their inner product IPn. Therefore, multiplication by the inner product IPn provides different distances of movement according to the difference in angle with the movement direction vector MV despite the same displacement ratio Rn for all vertices, as in equation [2]. That is, the larger the angle difference (maximum angle difference is 180 degrees when the MV and the NVn are pointing in exactly opposite directions), the greater the vertex backward displacement length.

FIG. 9B illustrates an example of object displayed according to the equation [2], in which vertex backward displacement lengths are different according to the angle difference between the normal vector NVn and the movement direction vector MV, thus making the displayed afterimage look more natural. In FIG. 9B, for example, normal vectors (shown by arrows) of the vertices P1, P2, P3 and P4 point in different directions, and the vertices P1 and P4, whose difference in angle with the direction of movement is relatively small, undergo a shorter displacement than the vertices P2 and P3 having a relatively large angle difference (L1<L2).

(3) Displace Vertices in the Direction Opposite to the Direction of Movement [3]

$$\text{Vertex coordinates} = (-MV) \times Rn + Vn \quad [3]$$

In equations [1] and [2], vertex coordinates are determined vertex by vertex based on the coordinates at the current timing Vn and the coordinates at the last timing VBn, however the same magnitude of the movement direction vector MV, that is, the object's distance or velocity of movement (except when the movement direction vector is a unit vector), is used indiscriminately for all vertices in the equation [3] and next equation [4], thus reducing the amount of calculations needed. This equation yields the same result as equation [1] if vertices are displaced by the same distance between sampling timings and if the distance is equal to the magnitude of the movement direction vector MV.

(4) Add the Inner Product IPn to (3)

$$\text{Vertex coordinates} = (-MV) \times Rn \times (-IPn) + Vn \quad [4]$$

Backward displacement length can be obtained according to the difference in angle with the movement direction vector, by taking the inner product IPn into consideration as is done in equation [2]. This equation yields the same result as equation [2] if vertices are displaced by the same distance between sampling timings and if the distance is equal to the magnitude of the movement direction vector MV.

The displacement length may be, for example, determined based on the object's acceleration or direction of movement in addition to the above.

[Designation of Transparency Level]

As discussed above, a rearward portion of an object can be displayed to look as if the portion leaves a trail by displacing polygon vertices backward during rendering processing, thus allowing for more effective display of the object movement. In the embodiment, moreover, the more rearwardly positioned the backward extended polygons are, the more transparent they are made, thus displaying the trail being left to look more natural.

For this reason, a transparency level α of vertices displaced backward is adjusted. A vertex is fully opaque when the transparency level α is 1 and fully transparent when the transparency level α is 0 (zero). The preset transparency level α for vertices of polygons making up an object is 1 (fully opaque), and in the embodiment the transparency level α is determined according to the backward displacement length. Note, however, that the preset transparency level α need not be 1.

(1) Assume (1−Rn) to be the Transparency Level α

The ratio Rn is a value between 0 (zero) and 1, and the displacement length is maximum when the ratio Rn=1. Consequently, assuming that the transparency level α=1−Rn, the transparency level α of vertices displaced backward=0 (zero) when the ratio Rn is maximum or 1. Therefore, the rearmost portion (vertex to be displaced) of an extended polygon becomes fully transparent while other portions from there onward that are closer to the object become gradually opaque due to decline in transparency level, thereby imparting a gradation to the polygon. The reason for this is that polygon portions, that are closer to other vertices whose transparency levels a are 1 or nearly 1, decline in transparency since the polygon transparency level is determined by a mixture ratio of the transparency levels a of polygon vertices.

Figure 10:
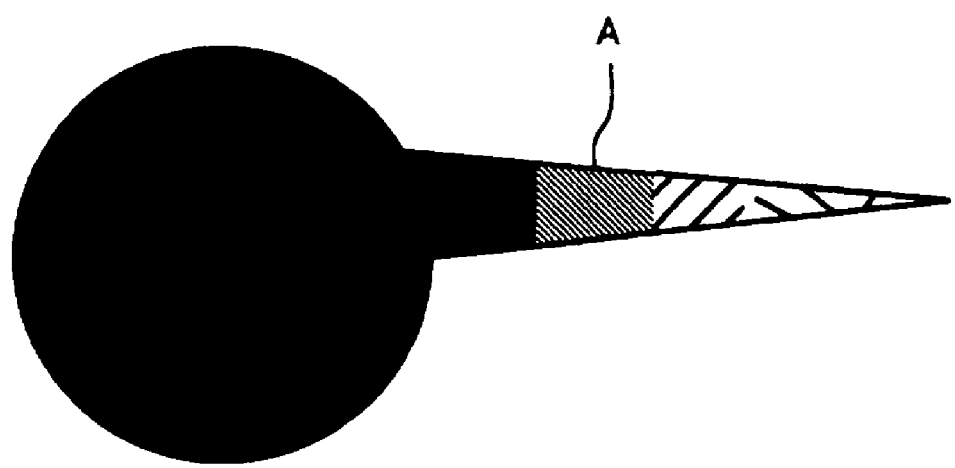
FIG. 10 is a diagram showing the state in which the transparency level of a polygon, extended backward from an object, changes gradually.

FIG. 10 illustrates a drawing showing the state in which the transparency level of polygons, extended backward from an object, changes gradually. As shown in FIG. 10, it is possible to display the object movement more naturally and effectively by ensuring that the extended polygon A increases in transparency level α with increase in distance from the object. Note that the transparency level α is indicated by the distance between oblique lines in FIG. 10. Although the transparency level α changes at separated region in FIG. 10 for reasons of convenience, the level practically changes in a continuous manner.

(2) Assume (1−(−IPn)) to be the Transparency Level α

When the equation [2] or [4] is used to determine vertex coordinates, the larger the angle difference between the normal vector NV and the movement direction vector MV for a vertex (that is, the larger the absolute value of their inner product IPn), the longer the backward displacement. Consequently, it is possible, by setting (1−(−IPn)) as the transparency level α, to impart a gradation effect as in the case (1) to a polygon extended backward from an object, that is, farther from the object the transparency level for polygon portions become higher and closer to the object the transparency level for polygon portions become lower according to the angle difference between the movement direction and the normal vector.

In the aforementioned embodiment, the direction in which to display the object afterimage is not limited to the direction opposite to the object's direction of movement, and those directions having a direction component in the opposite direction to the object's movement direction may be used such as a slanted direction on the opposite side of the object's direction of movement.

As for changes to gradation of extended polygons, changes are not limited to the transparency level set for displaced vertices as in the above embodiment, and saturation, lightness, brightness or hue set for displaced vertices may be changed. The extent of change may be determined according to the displacement ratio or normal vector direction (inner product) as discussed above or according to the object's distance, velocity, acceleration or direction of movement.

The polygon extension processing (afterimage display processing) in the embodiment need not be targeted for whole polygons making up an object. For example, such the processing may be applied to only some parts of polygons making up an object. For instance, the image processing method of the present embodiment may be applied only to "attacking arm parts" or "most vigorously moving parts" of human characters in a multi-player fighting game or to polygons of "taillight parts" of car characters in an auto racing game.

The deformed polygon may be displayed superposed on the object. This makes it possible to superpose a deformed object as an afterimage object on the original object rather than deform the original object itself.

Further, while the above embodiment displays an afterimage by extending polygons, applications of the present invention are not limited to such.

That is, unlike afterimage representation by polygon extension, pixels making up an object can be moved or extended in the direction opposite to the object's direction of movement.

FIGS. 11 to 17 illustrate explanatory diagrams of an embodiment of the present invention in which pixels making up an object are moved or extended in the direction opposite to the object's direction of movement.

Figure 11:
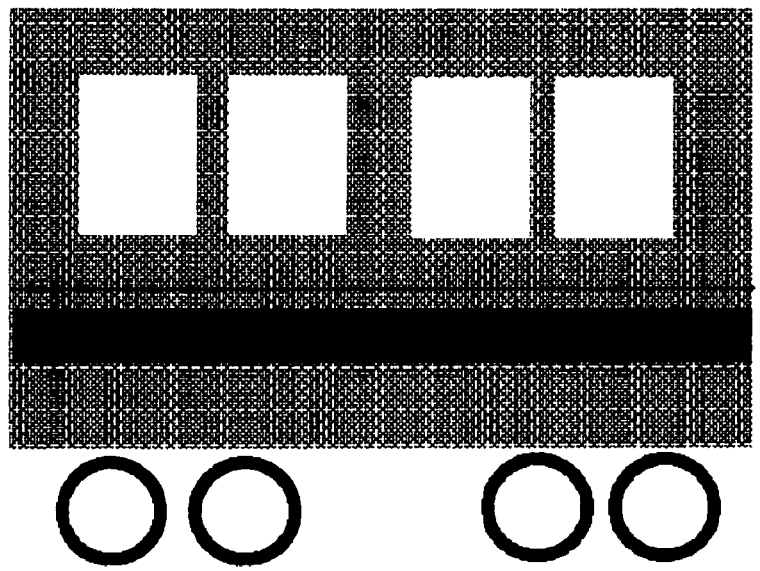
FIG. 11 is a first explanatory diagram of a further embodiment of the present invention.

FIG. 11 illustrates the state in which the object is at rest or moving slowly, showing an image of two dimensional vehicle made up of a set of pixels.

Figure 12:
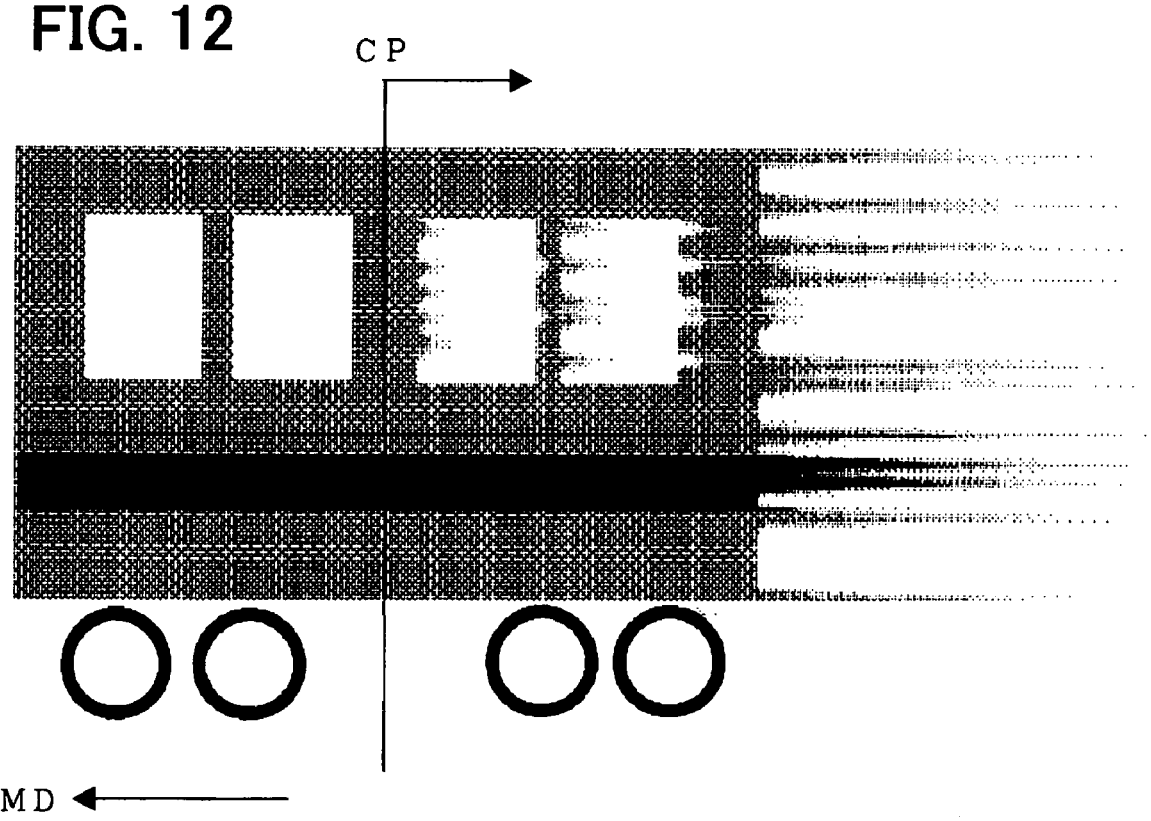
FIG. 12 is a second explanatory diagram of the further embodiment of the present invention.
Figure 13:
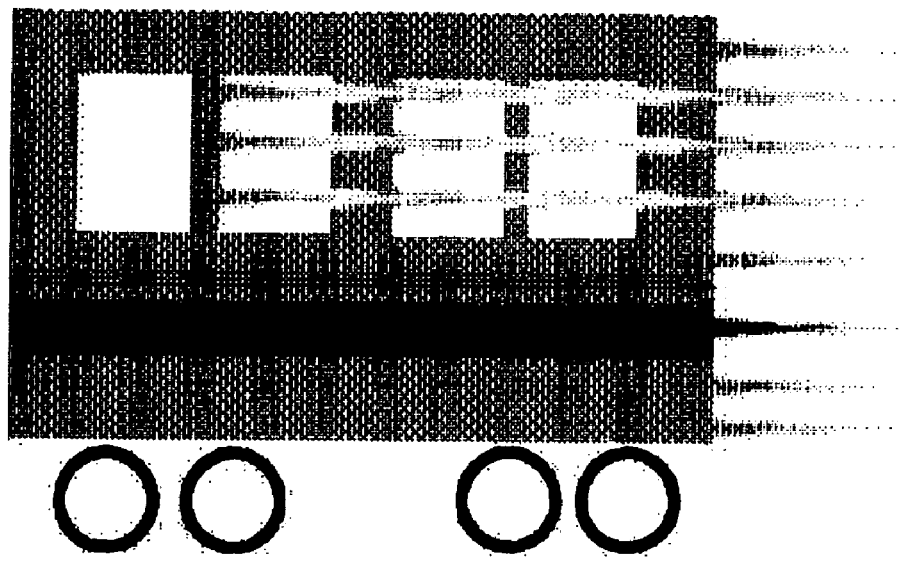
FIG. 13 is a third explanatory diagram of the further embodiment of the present invention.

FIG. 12 shows that pixels are extended, according to the present invention, from an arbitrary reference point (near center CP of the object as a working example) of the object (showing a vehicle as moving body) in the direction having vectors opposite to the movement direction MD.

In the present embodiment, an afterimage is represented by extending pixels without changing the object shape, thus effectively representing the object movement. Note that it is possible to impart more sense of speed to the object movement by, as a pixel extension method, not only simply adding or copying pixels in the direction opposite to the object's movement direction as shown in FIG. 12 but also undisplaying pixels making up object portions corresponding to the added portion.

The present method is applicable to not only two dimensional images as shown in FIG. 11 but also to three-dimensional images, that is, by extending pixels making up polygons.

While pixels are extended relative to the near center CP of the object in the direction having vectors opposite to the movement direction in FIG. 12 shown above, FIGS. 13 and 14 show working examples in which an arbitrary reference point is placed at the front-half portion of the object.

Figure 14:
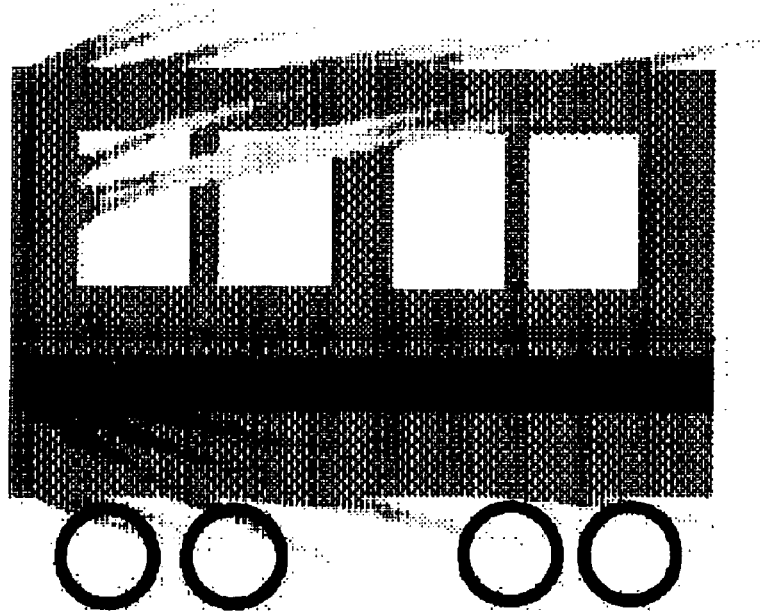
FIG. 14 is a fourth explanatory diagram of the further embodiment of the present invention.

Note that the direction in which pixels are extended is set at a slanted direction relative to the movement direction in the working example of FIG. 14.

Figure 15:
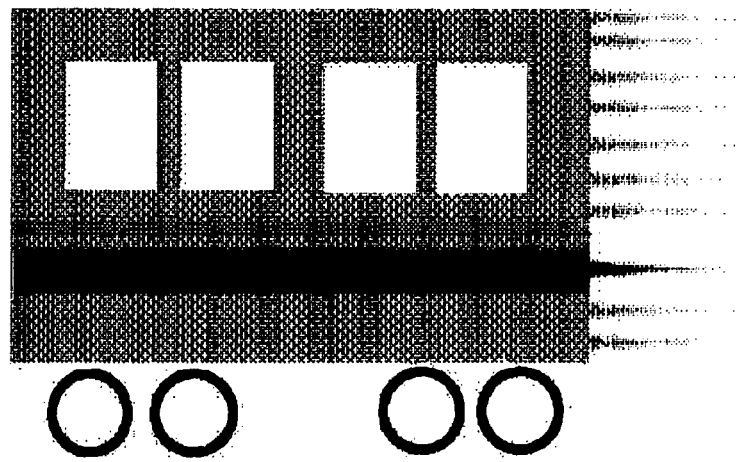
FIG. 15 is a fifth explanatory diagram of the further embodiment of the present invention.

FIG. 15 illustrates a working example in which an arbitrary reference point is placed at the rear-half portion of the object.

Figure 16:
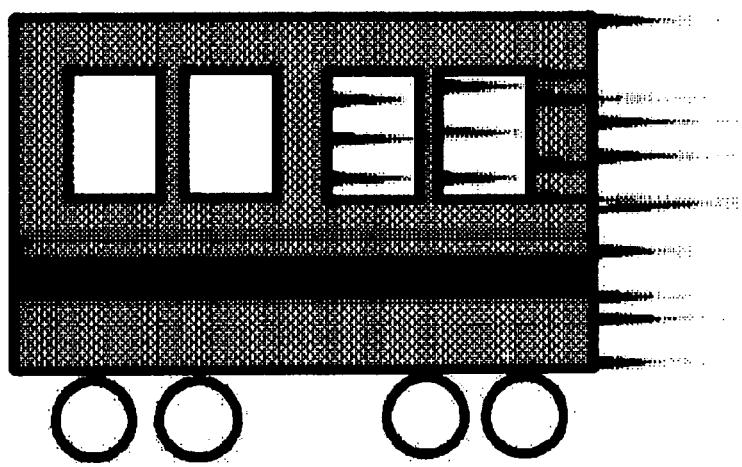
FIG. 16 is a sixth explanatory diagram of the further embodiment of the present invention.

A working example in FIG. 16 shows afterimage processing performed only on outlines extracted from portions for which afterimage is to be produced.

Figure 17:
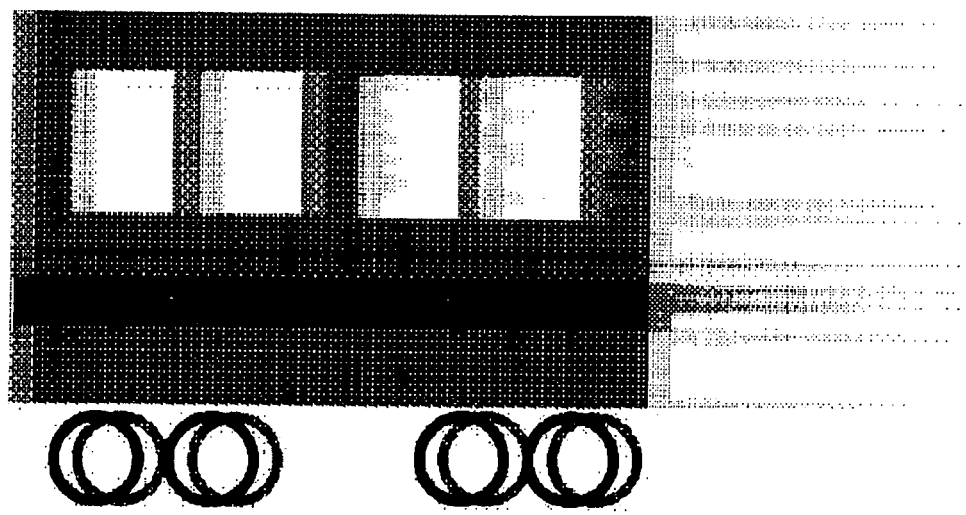
FIG. 17 is a seventh explanatory diagram of the further embodiment of the present invention.

Further, it is possible to represent a sense of movement of an object at high speed by superposing a semi-transparent afterimage without deforming the main body in a working example of FIG. 17. Note that an afterimage is deviated slightly to facilitate comprehension in FIG. 17.

Thanks to the present invention as shown in FIGS. 11 through 17, images for use as afterimages will be made unnecessary thus there are no need for superposing an afterimage object or tracing an afterimage in motion image pattern of movement as has been traditionally done. This allows for labor savings in design efforts.

Note that the image processing apparatus, that carries out the image processing methods in the aforementioned embodiments of the present invention, is not limited to computer game apparatuses provided in amusement facilities as shown in FIG. 1 and may be, for example, a home use computer game apparatus.

The scope of protection of the present invention is not limited to the above embodiments but even extends to the invention defined in claims and to the equivalents thereof.

INDUSTRIAL APPLICABILITY

Thus, according to the present invention, it is possible to impart an afterimage representation during display of moving objects by displacing backward given polygons making up the moving objects. This allows for display of the moving objects with richer expression.

The invention claimed is:

1. An image processing method for displaying an object, composed of a plurality of polygons, moving in a virtual three-dimensional space, the method comprising the steps of:
    acquiring, at every given sampling timing, coordinates of at least one vertex, whose normal vector has a component opposite to a movement direction vector of the object, among vertices of the polygons composing the object; and
    displaying the polygon having the at least one vertex assuming that coordinates of the at least one vertex are located at a position displaced by a given length in a direction having the component opposite to the movement direction.

2. The image processing method according to claim 1, further comprising the step of determining, based on an inner product of the normal vector of each vertex and the movement direction vector of the object, whether the normal vector of each vertex has the component opposite to the movement direction vector.

3. The image processing method according to claim 1 or 2, wherein the given length is determined based on at least one of the object's distance of movement, velocity of movement, acceleration of movement and direction of movement.

4. The image processing method according to claim 2, wherein the given length is determined based on coordinates at a current sampling timing and on coordinates at a last sampling timing.

5. The image processing method according to claim 4, wherein the given length is determined further in consideration of the inner product of the normal vector of each vertex and the movement direction vector of the object.

6. The image processing method according to claim 5, wherein the given length is determined further in consideration of a displacement ratio imparted to each vertex.

7. The image processing method according to claim 6, wherein the displacement ratio is set to different values for each vertices.

8. The image processing method according to claim 4, wherein the given length is determined further in consideration of a displacement ratio imparted to each vertex.

9. The image processing method according to claim 8, wherein the displacement ratio is set to different values for each vertices.

10. The image processing method according to claim 2, wherein the given length is determined based on a magnitude of the movement direction vector.

11. The image processing method according to claim 10, wherein the given length is determined further in consideration of the inner product of the normal vector of each vertex and the movement direction vector of the object.

12. The image processing method according to claim 11, wherein the given length is determined further in consideration of a displacement ratio imparted to each vertex.

13. The image processing method according to claim 12, wherein the displacement ratio is set to different values for each vertices.

14. The image processing method according to claim 10, wherein the given length is determined further in consideration of a displacement ratio imparted to each vertex.

15. The image processing method according to claim 14, wherein the displacement ratio is set to different values for each vertices.

16. The image processing method according to claim 1, wherein the given length is determined based on coordinates at a current sampling timing and on coordinates at a last sampling timing.

17. The image processing method according to claim 16, wherein the given length is determined further in consideration of the inner product of the normal vector of each vertex and the movement direction vector of the object.

18. The image processing method according to claim 17, wherein the given length is determined further in consideration of a displacement ratio imparted to each vertex.

19. The image processing method according to claim 18, wherein the displacement ratio is set to different values for each vertices.

20. The image processing method according to claim 16, wherein the given length is determined further in consideration of a displacement ratio imparted to each vertex.

21. The image processing method according to claim 20, wherein the displacement ratio is set to different values for each vertices.

22. The image processing method according to claim 1, wherein the given length is determined based on a magnitude of the movement direction vector.

23. The image processing method according to claim 22, wherein the given length is determined further in consideration of the inner product of the normal vector of each vertex and the movement direction vector of the object.

24. The image processing method according to claim 23, wherein the given length is determined further in consideration of a displacement ratio imparted to each vertex.

25. The image processing method according to claim 24, wherein the displacement ratio is set to different values for each vertices.

26. The image processing method according to claim 22, wherein the given length is determined further in consideration of a displacement ratio imparted to each vertex.

27. The image processing method according to claim 26, wherein the displacement ratio is set to different values for each vertices.

28. The image processing method according to any one of claims 20 to 13, further comprising the step of setting a transparency level set for the vertices to a value obtained by subtracting the displacement ratio of each vertex from a preset value.

29. The image processing method according to claim 1, further comprising the step of setting a transparency level set for the vertices to a value lower than a preset value.

30. The image processing method according to claim 29, wherein the transparency level set for the vertices is set to the value obtained by subtracting from a preset transparency level an absolute value of the inner product of the normal vector of each vertex and the movement direction vector of the object.

31. The image processing method according to claim 1, wherein the displayed polygons are displayed such that at least one of transparency level, saturation, lightness and hue changes with change in distance to the vertex.

32. The image processing method according to claim 31, wherein a magnitude of the change is determined based on at least one of the object's distance of movement, velocity of movement, acceleration of movement and direction of movement.

33. The image processing method according to claim 1, wherein the image processing method is a program executed on a computer.

34. An image processing apparatus for displaying an object, composed of a plurality of polygons, moving in a virtual three-dimensional space, the apparatus comprising:
   acquiring means which acquire, at every given sampling timing, coordinates of at least one vertex, whose normal vector has a component opposite to a movement direction vector of the object, among vertices of the polygons composing the object; and
   displaying means which display the polygon having the at least one vertex assuming that coordinates of the at least one vertex are located at a position displaced by a given length in a direction having the component opposite to the movement direction.

35. An image processing method for displaying an object such that the object moves on a screen, wherein
   the object is composed of a set of a plurality of pixels, the method comprising a step of moving pixels composing at least part of a region in the object by a given length in a direction having a component opposite to a movement direction of the object.

36. The image processing method according to claim 35, wherein at least some of the plurality of pixels composing the at least part of the region are undisplayed.

37. An image processing method for displaying a state in which an object, composed of a plurality of polygons, moving in a virtual three-dimensional space, moves in the virtual three-dimensional space, the method comprising the steps of:
   selecting at least one of vertices of the plurality of polygons composing the object; and
   displaying polygons having the selected vertices in a deformed manner assuming that the vertex coordinates are located at a position displaced by a given length in a direction having a component opposite to a movement direction of the object.

38. The image processing method according to claim 37, wherein the selected vertices are selected by defining a given reference point in the object and from among the plurality of vertices in the direction opposite, relative to the reference point, to the movement direction, of the plurality of polygons composing the object.

39. The image processing method according to claim 38, wherein the number of the selected vertices is less than the sum of the plurality of vertices located opposite, relative to the reference point, to the movement direction.

40. The image processing method according to claim 37, wherein when coordinates of the selected vertices are adjacent to each other, the given length, by which coordinates are displaced in the direction having the component opposite to the movement direction of the object, is set to values different from each other.

41. The image processing method according to claim 40, wherein the deformed polygons are displayed such that at least one of transparency level, saturation, lightness and hue changes with change in distance to the selected vertices located at the position displaced by the given length.

42. The image processing method according to claim 41, wherein the given length, by which the deformed polygons are displaced, and/or any of the changed transparency level, saturation, lightness and hue is set depending on the object's distance of movement, velocity of movement, acceleration of movement or direction of movement.

43. The image processing method according to claim 42, wherein the deformed polygons are displayed superposed over the object.

44. The image processing method according to claim 43, wherein the deformed polygons are displayed transparent in the object.

45. The image processing method according to claim 43 or 44, wherein the deformed polygons are displayed superposed over the object at deviated positions in the direction opposite to the movement direction of the object.

46. An image processing method for displaying a state in which an object, composed of a plurality of pixels moves in a virtual three-dimensional space, comprising the steps of:
   selecting at least one of the plurality of pixels composing the object; and
   displaying the selected pixels by moving the pixels to positions displaced by a given length in a direction having a component opposite to a movement direction of the object.

47. The image processing method according to claim 46, wherein the selected pixels are selected from pixels of portions outlining the object.

48. The image processing method according to claim 46, wherein the selected pixels are selected by defining a given reference point in the object and from among the plurality of pixels in the direction opposite, relative to the reference point, to the movement direction, of the plurality of pixels composing the object.

49. The image processing method according to claim 46, wherein the number of the selected pixels is less than the sum of the plurality of pixels located opposite, relative to the reference point, to the movement direction.

50. The image processing method according to claim 49, wherein when the selected pixels are adjacent to each other, the given length, by which pixels are moved in the direction having the component opposite to the movement direction of the object, is set to values different from each other.

51. The image processing method according to claim 50, wherein the moved pixels are displayed such that at least one of transparency level, saturation, lightness and hue changes with change in distance to the selected pixel located at the position moved by the given length.

52. The image processing method according to claim 51, wherein the given length, by which the moved pixels are moved, and/or any of the changed transparency level, saturation, lightness and hue is set depending on the object's distance of movement, velocity of movement, acceleration of movement or direction of movement.

53. The image processing method according to claim 51, wherein the moved pixels are displayed superposed over the object.

54. The image processing method according to claim 53, wherein the moved pixels are displayed transparent in the object.

55. The image processing method according to claim 53 or 54, wherein the moved pixels are displayed superposed over the object at deviated positions in the direction opposite to the movement direction of the object.

* * * * *